(12) United States Patent
Robinson (10) Patent No.: US 12,161,122 B2
(45) Date of Patent: Dec. 10, 2024

(54) COMPOSITIONS COMPRISING PESTICIDE PRECURSORS AND METHODS OF MAKING AND USE

(71) Applicant: MustGrow Biologics Corp., Saskatoon (CA)

(72) Inventor: James Robinson, Hague (CA)

(73) Assignee: MustGrow Biologics Corp., Saskatoon (CA)

( * ) Notice: Subject to any disclaimer, the term of this patent is extended or adjusted under 35 U.S.C. 154(b) by 0 days.

(21) Appl. No.: 14/314,661

(22) Filed: Jun. 25, 2014

(65) Prior Publication Data
US 2015/0005172 A1    Jan. 1, 2015

Related U.S. Application Data

(60) Provisional application No. 61/839,515, filed on Jun. 26, 2013.

(51) Int. Cl.
*A01N 65/08* (2009.01)
*A01N 47/46* (2006.01)

(52) U.S. Cl.
CPC ............. *A01N 65/08* (2013.01); *A01N 47/46* (2013.01)

(58) Field of Classification Search
CPC ........ A01N 65/08; A01N 47/46; A01N 25/00; A01N 51/00
See application file for complete search history.

(56) References Cited

U.S. PATENT DOCUMENTS

| | | |
|---|---|---|
| 5,717,056 A | 2/1998 | Varadarajan et al. |
| 5,747,056 A | 5/1998 | Potter et al. |
| 6,545,043 B1 | 4/2003 | Coats et al. |
| 7,087,553 B2 | 8/2006 | Riordan |
| 2008/0182751 A1 | 7/2008 | Morra et al. |
| 2008/0311192 A1 | 12/2008 | West et al. |
| 2013/0072554 A1 | 3/2013 | Zhang et al. |

FOREIGN PATENT DOCUMENTS

| | | | |
|---|---|---|---|
| CA | 2693262 A1 | 1/2009 | |
| CA | 2820392 A1 | 6/2012 | |
| WO | WO 2009012485 A1 * | 1/2009 | ............ A01N 51/00 |
| WO | 2012/074412 A1 | 6/2012 | |
| WO | WO 2012083446 A1 * | 6/2012 | ............ A01N 65/08 |
| WO | 2013/057675 A1 | 4/2013 | |

OTHER PUBLICATIONS

Thies, W. "Isolation of sinigrin and glucotropaeolin from Cruciferous seeds". Fat Science Technology, 1988, 8, 311-314. (Year: 1988).*
Visentin, M.; Tava, A.; Iori, R.; Palmieri, S. "Isolation and identification of trans-4-methylthio-3-butenyl glucosinolate from radish roots (*Raphanus satiVus* L.)". Journal of Agricultural and Food Chemistry, 1992, 40, 1687-1691. (Year: 1992).*
Bor, M. et al., Identification and Characterization of the glucosinolate-Myrosinase System in Caper (*Capparis ovata* Desf.), Plant Mol. Biol. Rep. (2009) 27: 518-525.
Shen, L. et al., "Endogenous and exogenous enzymolysis of vegetable-sourced glucosinolates and influencing factors" 2010, Food Chemistry 119: 987-994.
Brown, J. and Morra, M.J., "Glucosinolate-Containing Seed Meal as a Soil Amendment to Control Plant Pests 2000-2002", Subcontract Report National Renewable Energy Laboratory NREL/SR-510-35254, Jul. 2005.
Al-Gendy, A.A. et al., Glucosinolates, volatile constituents and biological activities of Erysimum corinthium Boiss. (Brassicaceae), 2010, Food Chemistry 118: 519-524.
Rodman, J.E., "A Taxonomic Analysis of Glucosinolate-Producing Plants, Part 1: Phenetics", Systematic Botany, (1991), 16:598-618.
Morra, M.J, "Chemical Characterization and Release Efficiency of Defatted Mustard Meals 2000-2002", Subcontract Report National Renewable Energy Laboratory NREL/SR-510-3628, Jul. 2005.
Braschi, I. et al., "Activity of myrosinase from *Sinapis alba* seeds immobilized into Ca-polygalacturonate as a simplified model of soil-root interface mucigel", Plant Soil (2011), 339:209-218.
Tao, C. and He, B.B., "Isolation of intact glucosinolates from mustard seed meal to increase the sustainabilityo f biodiesel utilization", An ASAE/CSAE Meeting Presentation, Paper No. 046079, Ottawa, Canada, Aug. 1-4, 2004.
Lazzeri, L. et al., "Effects of Glucosinolates and their Enzymatic Hydrolysis Products via Myrosinase on the Root-knot Nematode Meloidogyne incognita (Kofoid et White) Chitw.", J. Agric. Food Chem, 2004, 52, 6703-6707.
Worthington: "Substrate Concentration (Introduction to Enzymes)", Excerpted from "The Manual of Clinical Enzyme Measurements". Jan. 1, 1972, p. 1-2.

* cited by examiner

*Primary Examiner* — Scarlett Y Goon
*Assistant Examiner* — Andriae M Holt
(74) *Attorney, Agent, or Firm* — SMART & BIGGAR LP; Micheline Gravelle (57) ABSTRACT

Disclosed is a two-part pesticide formulation and methods of making and using. The pesticide formulation comprises a first part comprising a glucosinolate concentrate, and a second part comprising a plant material comprising myrosinase. The parts may be stored and transported in inactive form, and are activated upon application to a substrate requiring pesticide treatment.

15 Claims, 2 Drawing Sheets

COMPOSITIONS COMPRISING PESTICIDE PRECURSORS AND METHODS OF MAKING AND USE

CROSS-REFERENCE TO RELATED APPLICATIONS

This application claims priority to U.S. Provisional Patent Application No. 61/839,515, filed Jun. 26, 2013. The entire contents of the U.S. Provisional Patent Application No. 61/839,515 is incorporated herein by reference.

FIELD OF THE DISCLOSURE

The disclosure described herein relates to novel compositions useful for the treatment of pests and methods for making and using them, notably to compositions obtainable from plant materials.

BACKGROUND OF THE DISCLOSURE

The following paragraphs are provided by way of background to the present disclosure. They are not however an admission that anything discussed therein is prior art or part of the knowledge of persons skilled in the art.

Pesticides are used to control pests in areas such as crops, homes, and food storage areas. However the large scale use of pesticides, particularly in the second half of the twentieth century and early twenty first century, has resulted in significant concerns with respect to the environmental impact, increased resistance against pesticides in the pest populations, as well as toxicity to non-target organisms, including humans. Controversial is for example the use of polychlorinated hydrocarbons, such as DDT, as they persist for extended periods of time in the environment and are harmful to, for example, fish and birds of prey. Another class of pesticides, methylbromides, in addition to being toxic to the human nervous and respiratory system, poses damage to the stratospheric ozone layer, as a result of which governments in many jurisdictions have been severely restricting the use of methylbromides. Other widely used efficacious pesticides include organophosphates and carbamates, and while these compounds decompose more rapidly in the environment, they are still considered highly toxic.

One alternative is the use of pesticides obtainable from natural sources, also referred to in the art as biopesticides. These biopesticides are prepared from sources, such as plants, which frequently comprise natural defenses against insects and other pests. Glucosinolates which are ubiquitously found within the mustard plant family (also alternatively known to the art as "Cruciferae" or "Brassicaceae"), which includes for example, mustard and rapeseed, act as pesticides in many plants. The pesticidal efficacy of mustard plant material is attributable to glucosinolate breakdown products, including sinigrin, allyl thiocyanate and allyl isothiocyanate, rather than the glucosinolates themselves. These glucosinolate degradation products are formed following an enzymatic reaction involving enzymes endogenously present in mustard plant material, notably myrosinase. Myrosinase has been identified in a plurality of plant families and has been isolated and characterized in a significant amount of detail, see for example: Bor, M., Ozden, O, Ozedmir, F and Turkan I. Plant Mol. Biol. Rep. (2009) 27: 518-525 and Shen L., Su, G., Wang X., Du, Q and Wang K. (2010) Food Chemistry 119: 987-994.

Pesticide products based on plant material, including mustard plant material, are known to the prior art. US Patent Application 2008/0182751, for example, discloses the use of mustard plant material to control plant pests, including insects, and U.S. Pat. No. 5,717,056 teaches the use of mustard bran to control soil pests. The use of mustard meal to control plant pests is disclosed in Brown, J. and Morra, M. J, 2005, Subcontract Report National Renewable Energy Laboratory NREL/SR-510-35254. Purified products and organic extracts obtainable form mustard plants for use of the treatment of pests are also known to the prior art. In this regard U.S. Pat. No. 7,087,553 discloses a process for eliminating unwanted organisms in agriculture comprising the co-application of mustard oil in water and a solution of phosphorus in water. U.S. Pat. No. 6,545,043 teaches methods for suppressing target pests using a composition comprising a purified glucosinolate breakdown product obtainable from mustard plants. Furthermore, Gendy et al. (Gendy A. A., Gindi, O. D., Hafez, Al. S. and Ateya A. M. (2010) Food Chemistry 118: 519-524. demonstrate antimicrobial activity of glucosinolate breakdown products obtained from *Erysimum corinthium*. Mustard meal based glucosinolate products have been demonstrated to exhibit inhibitory effects against arthropods, as well as weeds, fungi and bacteria (see: Brown, J. and Mona, M. J, 2005, Subcontract Report National Renewable Energy Laboratory NREL/SR-510-35254).

Notwithstanding the foregoing, the potency of the plant material derived pesticides known to the prior art is lower than desirable, allowing for limited pest control, and requiring the use and application of substantial volumes of plant material in order to control the pests.

There therefore still are significant shortcomings in plant material based formulations capable of controlling pests that are known to the prior art. In particular, there is a need for a more potent pesticide prepared from plant material, allowing for the application of less plant material and less expensive pesticide formulations.

SUMMARY OF THE DISCLOSURE

The following paragraphs are intended to introduce the reader to the more detailed description that follows and not to define or limit the claimed subject matter of the present disclosure.

The present disclosure provides novel formulations comprising plant material that are useful in the treatment of pests. The formulations herein disclosed are superior to the heretofore known plant material based formulations in many respects, including with respect to their potency, ease of manufacture, safety and ease of storage, transportation and application.

Accordingly, the present disclosure provides a two-part pesticide precursor system essentially free of glucosinolate breakdown products comprising (a) a first part comprising a glucosinolate concentrate and (b) a second part comprising a plant material comprising an active myrosinase complex in a concentration sufficient to release an effective amount of glucosinolate breakdown products upon mixing of the first and second part in the presence of water.

In certain embodiments, the two parts are separated until application thereof in the presence of water to the pest. Upon such application, glucosinolate breakdown products are formed. In other embodiments, the two parts are admixed to form a mixture under mixing conditions that do not result in the formation of glucosinolate breakdown products. Upon application of the mixture to the pest in the presence of water glucosinolate breakdown products are formed.

In certain embodiments, the first part comprises a dry glucosinolate concentrate and the second part comprises a dry plant material. In this embodiment, the two parts may be maintained, stored and/or transported separately until application in the presence of water to the pest, or, alternatively, the two parts may be admixed to form a mixture and the mixture may be kept, stored and or transported. Providing water to the mixture results in the release of an effective amount of glucosinolate breakdown products. Accordingly, the present disclosure further provides a two-part inactive pesticide precursor system comprising a mixture essentially free of glucosinolate breakdown products, said mixture comprising (a) a first part comprising a dry glucosinolate concentrate and (b) a second part comprising a dry plant material comprising an active myrosinase complex in a concentration sufficient to release an effective amount of glucosinolate breakdown products upon the addition of water to the mixture.

In preferred embodiments of the present disclosure, the plant material comprising an active myrosinase complex is a seed meal. In a further preferred embodiment, the plant material is a seed meal obtainable or obtained from a mustard plant.

The amount of myrosinase complex in the formulation obtained upon mixing of the parts may be vary, but it may be as low as 0.004 myrosinase activity units per mg of glucosinolate.

The present disclosure further provides methods of preparing a two part pesticide precursor system essentially free of glucosinolate breakdown products comprising preparing (a) a first part comprising a glucosinolate concentrate and (b) a second part comprising a plant material comprising an active myrosinase complex in a concentration sufficient to release an effective amount of glucosinolate breakdown products upon mixing of the first and second component in the presence of water.

In preferred embodiments, the first part is a dry glucosinolate and the second part is a dry plant material. Accordingly, the present disclosure further provides methods of preparing an inactive pesticide precursor comprising preparing a mixture essentially free of glucosinolate breakdown products, said mixture comprising (a) a dry glucosinolate concentrate and (b) a dry plant material comprising an active myrosinase complex in a concentration sufficient to release an effective amount of glucosinolate breakdown products upon the addition of water to the mixture.

Other features and advantages of the present disclosure will become apparent form the following detailed description. It should be understood, however, that the detailed description and the specific examples, while indicating preferred embodiments of the disclosure, are given by way of illustration only, since various changes and modifications within the spirit and scope of the disclosure will become apparent to those of skill in the art from the detailed description.

BRIEF DESCRIPTION OF THE DRAWINGS

For a better understanding of certain example embodiments described herein, and to show more clearly how these various embodiments may be carried into effect, reference will be made, by way of example, to the accompanying figures which show at least one example embodiment, and the figures will now be briefly described. It should be understood that the figures herein are provided for illustration purposes only and are not intended to limit the present disclosure.

DETAILED DESCRIPTION OF THE DISCLOSURE

Various compositions and methods will be described below to provide an example of an embodiment of each claimed subject matter. No embodiment described below limits any claimed subject matter and any claimed subject matter may cover methods, processes, compositions or systems that differ from those described below. The claimed subject matter is not limited to compositions or methods having all of the features of any one composition, method, system or process described below or to features common to multiple or all of the compositions, systems or methods described below. It is possible that a composition, system, method or process described below is not an embodiment of any claimed subject matter. Any subject matter disclosed in a composition, system, method or process described below that is not claimed in this document may be the subject matter of another protective instrument, for example, a continuing patent application, and the applicants, inventors or owners do not intend to abandon, disclaim or dedicate to the public any such subject matter by its disclosure in this document.

It should be noted that terms of degree such as "substantially", "essentially" "about" and "approximately" as used herein mean a reasonable amount of deviation of the modified term such that the end result is not significantly changed. These terms of degree should be construed as including a deviation of the modified term if this deviation would not negate the meaning of the term it modifies.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

All publications, patents and patent applications are herein incorporated by reference in their entirety to the same extent as if each individual publication.

As hereinbefore mentioned, the present disclosure relates to novel compositions comprising mustard plant material for use in the control of pests. The present inventors have surprisingly found that a two-part composition comprising a glucosinolate concentrate and a plant material comprising an active myrosinase complex may be used to prepare a pesticide. Upon the addition of water to the composition, an effective amount of pesticidally active products is generated permitting use as a pesticide against a wide range of different pests including, without limitation, bacterial pests, fungal pests, plant pests and insect pests. In particular, the compositions of the present disclosure, require surprisingly low concentrations of active myrosinase complex, relative to the concentration of substrate glucosinolate, to yield a potent pesticidally effective product upon the addition of water, resulting in superior pesticide manufacturing economics, and the use of limited quantities of pesticide. The potencies that may be achieved using the novel compositions of the present disclosures exceed the potencies of compositions known to the prior art on a per unit of myrosinase activity basis. Furthermore the compositions provided permit control over the enzymatic reaction responsible for the conversion of glucosinolates into pesticidally active products, allowing for the preparation of compositions with a wide range of varying potencies. Moreover the compositions provided are easy to use since they are pesticidally inactive, and activated when ready for use by adding water to the compositions, thus facilitating storage and transportation. Finally, the compositions provided herein are additionally beneficial in that they are natural, organic and biodegradable.

Accordingly, the present disclosure provides a two-part pesticide precursor system essentially free of glucosinolate breakdown products comprising (a) a first part comprising a glucosinolate concentrate and (b) a second part comprising a plant material comprising an active myrosinase complex in a concentration sufficient to release an effective amount of glucosinolate breakdown products upon mixing of the first and second part in the presence of water.

TERMS AND DEFINITIONS

The term "glucosinolate breakdown product" refers to products obtainable following hydrolysis of glucosinolate. The term "glucosinolate" as used herein refers to a chemical compound having the formula (I):

(I)

Examples of glucosinates that may be used in accordance with the present disclosure are epiprogoitrin, sinigrin and/or sinalbin. The term "epiprogoitrin" as used herein refers to a chemical compound having the formula (II):

(II)

The term "sinigrin" as used herein refers to a chemical compound having the formula (III):

(III)

The term "sinalbin" as used herein refers to a chemical compound having the formula (IV):

(IV)

Included within the term "glucosinolate breakdown products", are three general classes of glucosinolate breakdown products, nitriles, thiocyanates and/or isothiocyanates. As used herein the term "nitrile" refers to a chemical compound having the formula (VI):

(VI).

As used herein the term "thiocyanate" refers to a chemical compound having the formula (VII):

(VII)

As used herein the term "isothiocyanate" refers to a chemical compound having the formula (VIII):

(VIII)

Further glucosinolate breakdown products include allyl thiocyanate, allyl isothiocyanate and allyl cyanide all of which are breakdown products of the glucosinolate sinigrin. The terms "allylthiocyanate" or "ATC" as used herein refers to a chemical compound having the formula (IX):

(IX)

The terms "allylisothiocyanate" or "AITC", as may be used interchangeably herein, refer to a chemical compound having the formula (X):

(X)

The terms "allyl cyanate" or "AC", as may be used interchangeably herein, herein refers to a chemical compound having the formula (XI):

(XI)

Further glucosinolate breakdown products in accordance with the present disclosure include 1-cyano-2-hydroxy-3-butene ("CHB") and goitrin, which are obtained following the breakdown of the glucosinolate epiprogoitrin. Still further glucosinolate products in accordance herewith include hydroxyl benzols.

The terms "myrosinase" and "active myrosinase complex" refer to any enzyme complex which is capable of converting glucosinolates into pesticidally active glucosinolate breakdown products. The activity of myrosinase is expressed herein in myrosinase activity units. Wherein 1 unit of myrosinase activity is defined as the amount of enzyme needed to hydrolyze 1 micromole of sinigrin per minute at pH 6.5 and 37° C. Furthermore, the myrosinase concentration herein may be expressed as the amount of myrosinase activity per unit mass of glucosinolate, e.g. a certain preparation may comprise 1 unit of myrosinase activity per milligram (mg) of sinigrin.

As used herein the term "essentially free from glucosinolate breakdown products" means that a preparation in accordance with the present disclosure comprises a concentration of glucosinolate breakdown products of less than 0.5% or about 0.5%, more preferably less than 0.25% or about 0.25%, and most preferably 0%.

General Implementation
Preparation of the First Part—Glucosinolate Concentrate

In accordance with the present disclosure, a first part comprising a glucosinolate concentrate is prepared. The glucosinolate concentrate may conveniently be prepared by extraction thereof from natural sources. Such natural sources include any plants comprising glucosinolates. Plants comprising glucosinolates that may be used in accordance herewith include plants belonging to the families of Brassicaceae (Cruciferae), Akaniaceae, Bataceae, Bretschneideraceae, Capparaceae, Caricaceae, Drypetes (Euphorbiaceae), Gyrostemonaceae, Limnanthaceae, Moringaceae, Pentadiplantdraceae, Resedaceae, Salvodoraceae, Tovariaceae, and Tropaeolaceae. In preferred embodiments, the glucosinolate concentrate is prepared from a mustard plant. Representative examples of mustard plants that may be used in accordance with the present disclosure include *Brassica napus* (rapeseed), *Brassica juncea* (Oriental, Indian or brown mustard), *Brassica carinata* (Abyssinian or Ethiopian mustard), *Brassica nigra* (black mustard), *Brassica rapa* (rapeseed), *Sinapsis alba* (yellow or white mustard), *Sinapsis arvensis* (wild mustard), *Erysimum corinthium* and any cultivars of the foregoing including the Canola cultivar of *Brassica napus*. In preferred embodiments, a mustard plant belonging to the genus *Brassica* is used, and in a particularly preferred embodiment, *Brassica juncea* is used.

In accordance with the present disclosure, the glucosinolate concentrate is prepared in such a manner that it is essentially free from glucosinolate breakdown products. As used herein "essentially free from glucosinolate breakdown products" means that the glucosinolate concentrate prepared in accordance with the present disclosure comprises a concentration of glucosinolate breakdown products of less than 0.5% or about 0.5%, more preferably less than 0.25% or about 0.25%, and most preferably 0%.

The glucosinolate concentrate in accordance with the present disclosure may conveniently be prepared from an aqueous plant extract. Such extract may be prepared by obtaining plant material comprising glucosinolates e.g. plant seeds, leaves, roots, stems. Plants seed material is preferred as it typically contains substantial quantities of glucosinolates. The plant material is typically comminuted (e.g. using a grinder or a mill) and mixed in the presence of water under conditions under which the highly water soluble glucosinolates enter the aqueous phase of a water:plant material mixture or slurry. In embodiments hereof where plant seeds are used, a meal may be obtained, e.g. a *Brassica juncea* meal. Where plant material comprising myrosinase is used as a glucosinolate source material, the enzyme is preferably inactivated e.g. by conducting the extraction process at high temperature, e.g. using water or more than about 80° C., more preferably more than about 90° C., and more preferably at about 97° C. The solids in the slurry are then separated from the water using established processes such as centrifugation and/or filtration (using e.g. filter paper). The glucosinolates in the aqueous extract can optionally be further concentrated by separation from other water-soluble components of the extract using established processes, such as nanofiltration or further concentrated through the process of evaporation. Optionally, residual oil in the extract can be removed using established processes such as disk-stacked centrifugation or oil coalescence followed by separation in a settling tank. In embodiments where seed meal is prepared, e.g. *Brassica juncea* seed meal, such oil removal results in a de-oiled meal, comprising for example less than 20% residual oil, or less than 15% residual oil, e.g. 14%, 13%, 12%, 11% or 10% residual oil. The preparation may comprise a substantial quantity of water, e.g. from about 10% to about 90% and the preparation may be a relatively pure e.g. a 60% (w/w) 75% (w/w), 80% (w/w), 90% (w/w), 95% (w/w) or 99% (w/w) pure glucosinolate concentrate, or a relatively crude glucosinolate concentrate, e.g. a 50% (w/w) 40% (w/w), 30% (w/w), 28% (w/w), 26% (w/w), 24% (w/w), 22% (w/w) or 20% (w/w) pure glucosinolate concentrate. In embodiments of the present disclosure wherein the first part comprises a dry glucosinolate preparation, after the glucosinolates have been concentrated, water is removed, for example by evaporation and/or thermal drying processes to generate a final dry glucosinolate concentrate. The glucosinolate concentrate may be comprised substantially of a single glucosinolate, and it may be, for example, a sinigrin concentrate, a epiprogoitrin concentrate, or a sinalbin concentrate, or it may be comprised of a mixture of two or more glucosinolates. In embodiments hereof where a dry glucosinolate is prepare the glucosinolate concentrate contains preferably less than about 15% or about 15% water, more preferably less than about 10% or about 10% water, and most preferably less than 3% or about 3% water. Further methodologies for extracting glucosinolates are described in for example: C. Tao and B. B. He, 2004, isolation of glucosinolates from mustard seed meal to increase the sustainability of biodiesel utilization, presentation at ASAE/CSAE Meeting, Ottawa, Ontario, Canada.

Preparation of the Second Part—Plant Material Comprising an Active Myrosinase Complex In accordance with the present disclosure, a second part comprising a plant material comprising an active myrosinase complex is prepared. In accordance with the present disclosure any plant material obtainable or obtained from plants comprising myrosinase may be used, including any plant material, or processed plant material, obtainable or obtained from the leaves, stems, roots or seeds of these plants. Plants comprising myrosinases that may be used in accordance herewith include plants belonging to the plant families of Brassicaceae (Cruciferae), Akaniaceae, Bataceae, Bretschneideraceae, Capparaceae, Caricaceae, Drypetes (Euphorbiaceae), Gyrostemonaceae, Limnanthaceae, Moringaceae, Pentadiplantdraceae, Resedaceae, Salvodoraceae, Tovariaceae, and Tropaeolaceae, in all of which myrosinase complexes have been identified (Rodman, J. E. (1991) Phenetics. Systematic. Bot. 16: 598-618). In preferred embodiments, the plant material that is used is obtained or obtainable from a mustard plant. The term "mustard" and "mustard family" as used herein denotes any plant belonging to the family of Brassicaceae, including any plant belonging to the genera *Brassica* and *Sinapsis*. Representative examples of mustard plants that may be used in accordance with the present disclosure include *Brassica napus* (rapeseed), *Brassica juncea* (Oriental, Indian or brown mustard), *Brassica carinata* (Abyssinian or Ethiopian mustard), *Brassica nigra* (black mustard), *Brassica rapa* (rapeseed), *Sinapsis alba* (yellow or white mustard), *Sinapsis arvensis* (wild mustard), *Erysimum corinthium* and any cultivars of the foregoing including the Canola cultivar of *Brassica napus*. In preferred embodiments *Sinapsis alba* is used.

Preferably the plant material as used herein is treated such as to produce a processed plant material. The plant material may for example be crushed or pressed to obtain a crushed or pressed plant material. In accordance with the present disclosure the plant material is processed in such a manner that the myrosinase activity is retained. Processing conditions suitable to retain myrosinase activity include temperatures below preferably 60° C., more preferably below 50° C. and most preferably below 35° C. Under such conditions dry plant material comprising an active myrosinase complex may be obtained and used in accordance with the current disclosure. When oil rich plant material is used in accordance herewith, such as seed, it is preferable to remove the oil from the plant material. This may be accomplished through methods such as solvent extraction, hydraulic pressing, expeller pressing, cold pressing and other oil removal processes that will be well known to the skilled artisan, and in this manner a de-oiled plant material, e.g. a de-oiled seed meal may be obtained, e.g. *Sinapsis alba* seed meal containing less than 20% residual oil, or less than 15% residual oil, e.g. 14%, 13%, 12%, 11% or 10% residual oil. In other embodiments other fractions, for example the seed husks, may be removed from the plant material to obtain a plant material comprising an active myrosinase complex. The myrosinase complex may also be concentrated by processes such as aqueous extraction and fractionation of the extract, and it may be possible to obtain a more or less pure myrosinase fraction. Myrosinase is a water-soluble protein and will be concentrated in the aqueous fractions. Further aqueous processing can be used to further concentrate the myrosinase prior to drying. Ultrafiltration is one example of an aqueous processing technique that can be used to concentrate the myrosinase. The amount of water present in the myrosinase preparations is typically from about 10% to about 90%.

To obtain dry plant material, the plant material is dried resulting in the removal of endogenous water present in the plant material. Drying of the plant material in accordance herewith is achieved using methodologies generally known to the skilled artisan. Such methods include, without limitation, processing of the plant material through use of a grain dryer or a seed conditioner designed to remove moisture from the material down to a defined level, which may be combined as hereinbefore mentioned with further processing of the plant material using aqueous extraction and fractionation. Other examples of methodologies that may be used in accordance herewith to obtain dried plant material comprising an active myrosinase complex include spray drying, flash drying and freeze drying. As hereinbefore mentioned the processing conditions applied to prepare the dried plant material in accordance herewith are relatively mild. Similarly, drying conditions applied are relatively mild, with temperatures preferably not exceeding 60° C., more preferably not exceeding 50° C. and most preferably not exceeding 35° C. Drying of the plant material may be performed before and/or after any other optional processing of the plant material. Upon completion of the drying of the plant material, e.g. meal, the relative humidity of the plant material is preferably less than 15% or about 15%, more preferably less than 10% or about 10% and most preferably less than 7% or about 7%, e.g. 6%, 5%, 4%, 3%, 2%, 1% or 0%.

In a preferred embodiment of the present disclosure, the processed plant material used is a seed meal. In more preferred embodiments, the seed meal is prepared from mustard plants and in most preferred embodiments, the seed meal is prepared from *Sinapsis alba*. Many processes for processing raw mustard seed into oil and meal are known to the art. Illustrative processes are those taught by and Mona, M. J, 2000-2002, Subcontract Report National Renewable Energy Laboratory NREL/SR-510-3628. Typical of these processes is the receipt of mustard seed from the field by conventional transport means, for example, rail or truck, in a dirty and often wet condition. The mustard seed is then subjected to an elementary separation procedure, for example, contacted with a vibrating screen or using a grain cleaning machine, for example a grain cleaning machines manufactured by Damas A/S (Denmark), in which the mustard seed is separated from non-mustard seed material, such as rocks, sticks, dirt, leaves, weed seeds, loose hulls etc. It is preferred that following cleaning the mustard seed is dried, using for example a grain dryer as manufactured by Vertec Industries Limited (Canada), so that the moisture content of the seed is reduced to between 5% and 7%. Following the removal of non-mustard seed contaminants and drying the mustard seed may be stored, mixed with other mustard seed, or processed to obtain mustard seed meal. At this point in the process the outer seed coating, which is also known as the seed husk or bran, may be removed from the seed by milling or cracking the seed or using another suitable abrasive process to obtain the seed kernel. Such removal of the bran is however optional and not of critical importance. The next step in the process is largely dependent on the oil (also known as "lipid" or "fat") content of the mustard meal that is desired. If a "full fat" meal is desired than the kernels are subjected to a process that does not result in oil extraction. If, on the other hand a "defatted" meal is desired than the kernels are subjected to a process resulting in oil removal. In preferred embodiments of the present disclosure a defatted meal is prepared. Accordingly the mustard seed or mustard kernel (in instances where the bran has been removed) is preferably ground, using for example a hammer mill, to obtain mustard flour. Thereafter the oil is removed from the flour by organic solvent extraction for example, using for example hexane, or mechanical separation from the non-oil components of the seed using for example an oil expeller or press, such as an oil press such as a Täby Press manufactured by Skeppsta Maskin AB (Sweden) or a Komet oil expeller manufactured by Monforts Oekotec GmbH (Germany). A combination of mechanical oil removal followed by organic solvent extraction can also be used to achieve maximum removal of oil from the seed. Preferably the mustard seed meal used in accordance with the present disclosure comprises between 2% and 50% of the available seed oil, and more preferably approximately between 10 and 15%, and most preferably 15% of the available seed oil. In preferred embodiments of the present disclosure, the mustard seed meal obtained at this point has a moisture content of less than 12% in the process is ready for use as an ingredient for formulation with other optional ingredients referred to in this application.

Preparation of Two-Part Pesticide Precursors

The present disclosure provides a two-part pesticide precursor system essentially free of glucosinolate breakdown products comprising (a) a first part comprising a glucosinolate concentrate and (b) a second part comprising a plant material comprising an active myrosinase complex in a concentration sufficient to release an effective amount of glucosinolate breakdown products upon mixing of the first and second part in the presence of water.

The two-part pesticide precursors of the present preparations are essentially free of glucosinolate breakdown products. Thus the glucosinolate concentrate is essentially free of glucosinolate breakdown products, and the plant material comprising an effective amount of myrosinase complex is essentially free of glucosinolate breakdown products. The foregoing is applicable in embodiments of the disclosure wherein the parts of the two-part system are separated, as well as in embodiments wherein the two parts are admixed. Only upon the subsequent addition of water to the parts are glucosinolate breakdown products are formed.

In certain embodiments hereof, the two parts are separated until application thereof in the presence of water to the pest. Thus the two parts may conveniently be transported and/or stored until they are ready for application to a substrate in need of treatment with a pesticide. In these embodiments one or both parts may be more or less aqueous (i.e. containing in excess of 10% (v/v) water, e.g. in excess of 50% (v/v), 60% (v/v), 70% (v/v), 80% (v/v) or 90% (v/v)) or one or both parts may be prepared in dry form, as a powder or particulate (i.e. containing less than about 10% v/v water). Upon mixing of the two parts in the presence of water, which may be exogenously added (in embodiments where the two parts are present in dry form), or which may be endogenously present (where aqueous preparations are used), glucosinolate breakdown products are formed and the product is ready for application to a substrate in need thereof. In other embodiments, the two parts are admixed to form a mixture under mixing conditions that do not result in the formation of glucosinolate breakdown products. Such conditions typically involve the absence of water, i.e. the mixture is a dry powder mixture comprising a water content of no more than 15% (v/v), preferably no more than 5% (v/v), and more preferably no more than 1% (v/v). Upon mixing the powder mixture in the presence of water, glucosinolate breakdown products are formed and the product may be applied to a substrate in need of treatment with a pesticide.

In a certain embodiments, the first part comprises a dry glucosinolate concentrate and the second part comprises a dry plant material. In this embodiment, the two dry parts may be maintained, stored and/or transported separately until application in the presence of water to the substrate in need of pesticide treatment, or the two parts may be admixed to form a mixture and the mixture may be kept, stored and or transported. Providing water to the mixture in the presence of water results in the release of an effective amount of glucosinolate breakdown products. Accordingly, the present disclosure further provides a two-part inactive pesticide precursor system comprising a mixture essentially free of glucosinolate breakdown products, said mixture comprising (a) a first part comprising a dry glucosinolate concentrate and (b) a second part comprising a dry plant material comprising an active myrosinase complex in a concentration sufficient to release an effective amount of glucosinolate breakdown products upon the addition of water to the mixture.

In preferred embodiments of the present disclosure, the plant material comprising an active myrosinase complex is a seed meal. In a further preferred embodiment the plant material is a seed meal obtainable or obtained from a mustard plant. The concentration of myrosinase complex in the mixture may be varied but may be as low as 0.1 units per gram of plant material.

The present disclosure further provides methods of preparing a two-part pesticide precursor system. Accordingly, the present disclosure provide a method of preparing a two part pesticide precursor system essentially free of glucosinolate breakdown products comprising preparing (a) a first part comprising a glucosinolate concentrate and (b) a second part comprising a plant material comprising an active myrosinase complex in a concentration sufficient to release an effective amount of glucosinolate breakdown products upon mixing of the first and second component in the presence of water.

In preferred embodiments the first part is a dry glucosinolate and the second part is a dry plant material. Accordingly, the present disclosure further provides methods of preparing an inactive pesticide precursor comprising preparing a mixture essentially free of glucosinolate breakdown products, said mixture comprising (a) a dry glucosinolate concentrate and (b) a dry plant material comprising an active myrosinase complex in a concentration sufficient to release an effective amount of glucosinolate breakdown products upon the addition of water to the mixture.

In order to prepare an active pesticide product from the inactive pesticide precursors of the present disclosure, the glucosinolate concentrate is mixed with the plant material in the presence of water. Conventional mixing methodologies may be used in this regard, using stirring or shaking equipment. In accordance with the present disclosure, the myrosinase is present in the mixture in a concentration that is sufficient to release an effective amount of glucosinolate breakdown products. "Effective amount" as used herein is any amount that results in the reduction of the severity or detrimental effect caused by a pest for a limited or prolonged period of time. The amount of water used may vary, but typically exceeds 1,000 gallons per 1,000 lbs of the mixed parts, where dry formulations are used. By way of example, a mixture comprising 504 lbs of dry *Sinapsis alba* meal and 504 lbs of a dry 24% sinigrin concentrate is preferably mixed with between 5,000 and 30,000 gallons of water. Where aqueous formulations are used the amounts of aqueous formulation used typically lower e.g. 5 gallons of aqueous formulation may be applied in the presence of 5,000-30,000 gallons of water.

The inventors have determined that the plant material comprising myrosinase used may comprise surprisingly low concentrations of myrosinase activity units relative to the concentration of glucosinolate in the product. In particular, the inventors have determined that the amount of myrosinase relative to the amount of glucosinolate used to prepare the two-part system of the present disclosure may be substantially less than the amount of myrosinase relative to the amount of glucosinolate that is naturally present in plant materials, e.g. seed meal. Thus in preferred embodiments of the present disclosure, formulations are prepared in such a manner that upon mixing of the two parts a formulation is obtained in which the myrosinase activity per unit mass of glucosinolate is lower than the myrosinase activity per unit mass of glucosinolate naturally present in the plant material. Preferably, the myrosinase activity per unit mass of glucosinolate is less than one half of the myrosinase activity per unit mass of glucosinolate naturally present in the plant material, more preferably more than 10 times less, more than 50 times less, more than 100 times less, more than 250 times less, or more than 1,000 times less. Preferably upon mixing of the two parts, a formulation is obtained that comprises less than 0.96 or about 0.96 myrosinase activity units per mg of glucosinolate, e.g. less than 0.50 or about 0.50 myrosinase activity units per mg of glucosinolate, or e.g. less than 0.25 units or about 0.25 myrosinase activity units per mg of glucosinolate, e.g. less than 0.20 or about 0.20 units per mg of glucosinolate, or e.g. less than 0.15 or about 0.15 myrosinase activity units per mg of glucosinolate, or e.g. less than e.g. 0.10 units or about 0.10 myrosinase activity units per mg of glucosinolate, or e.g. less than 0.05 units or about 0.05 myrosinase activity units per mg of glucosinolate, or e.g. less than 0.01 units or about 0.01 myrosinase activity units per mg of glucosinolate, or e.g. less than 0.0075 units or about 0.0075 myrosinase activity units per mg of glucosinolate, e.g. less than 0.005 units or about 0.005 myrosinase activity units per mg of glucosinolate, or e.g. less than 0.004 units or about 0.004 myrosinase activity units per mg of glucosinolate, or e.g. less than 0.001 units or about 0.001 myrosinase activity units per mg of glucosinolate. The hydrolysis rate achieved in the foregoing formulations exceeds the hydrolysis rate achieved when plant material naturally comprising myrosinase and glucosinolate is mixed in the presence of water. Preferably the hydrolysis rate in the formulations of the present disclosure is at least 2 times the hydrolysis rate achieved when plant material naturally comprising myrosinase and glucosinolate is mixed in the presence of water, e.g. at least 5 times, or at least 10 times or at least 20 times. Preferably the hydrolysis rate of the formulations of the present disclosure is in excess of 12.5 µmol of glucosinolate hydrolyzed per minute, more preferably in excess of 25 or about 25 µmol glucosinolate/minute e.g. 50 or about µmol glucosinolate/minute, 75 or about 75 µmol glucosinolate/minute, or 100 or about 100 µmol glucosinolate/minute. In preferred embodiments the glucosinolate is sinigrin. Accordingly, preferably, the myrosinase activity per unit mass of sinigrin is less than one half of the myrosinase activity per unit mass of sinigrin naturally present in the plant material, more preferably more than 10 times less, more than 50 times less, more than 100 times less, more than 250 times less, or more than 1,000 times less. Preferably upon mixing of the two parts, a formulation is obtained that comprises less than 0.96 or about 0.96 myrosinase activity units per mg of sinigrin, e.g. less than 0.50 or about 0.50 myrosinase activity units per mg of sinigrin, or e.g. less than 0.25 units or about 0.25 myrosinase activity units per mg of sinigrin, e.g. less than 0.20 or about 0.20 units per mg of sinigrin, or e.g. less than 0.15 or about 0.15 myrosinase activity units per mg of sinigrin, or e.g. less than e.g. 0.10 units or about 0.10 myrosinase activity units per mg of sinigrin, or e.g. less than 0.05 units or about 0.05 myrosinase activity units per mg of sinigrin, or e.g. less than 0.01 units or about 0.01 myrosinase activity units per mg of sinigrin, or e.g. less than 0.0075 units or about 0.0075 myrosinase activity units per mg of sinigrin, e.g. less than 0.005 units or about 0.005 myrosinase activity units per mg of sinigrin, or e.g. less than 0.004 units or about 0.004 myrosinase activity units per mg of sinigrin, or e.g. less than 0.001 units or about 0.001 myrosinase activity units per mg of sinigrin. The hydrolysis rate achieved in the foregoing formulations exceeds the hydrolysis rate achieved when plant material naturally comprising myrosinase and sinigrin is mixed in the presence of water. Preferably the hydrolysis rate in the formulations of the present disclosure is at least 2 times the hydrolysis rate achieved when plant material naturally comprising myrosinase and sinigrin is mixed in the presence of water, e.g. at least 5 times, or at least 10 times or at least 20 times. Preferably the hydrolysis rate of the formulations of the present disclosure is in excess of 12.5 µmol of sinigrin hydrolyzed per minute, more preferably in excess of 25 or about 25 µmol sinigrin/minute e.g. 50 or about µmol sinigrin/minute, 75 or about 75 µmol sinigrin/minute, or 100 or about 100 µmol sinigrin/minute.

The glucosinolate breakdown products that are formed upon hydrolysis of glucosinolate may vary and include any nitrile, thiocyanate, or isothiocyanate and mixtures thereof. In preferred embodiments, the glucosinolate concentrate is a sinigrin concentrate and the sinigrin breakdown products are alylthiocyanate, allylisothiocyanate or alylcyanate and mixtures thereof.

The formulations prepared in accordance with the present disclosure further preferably comprise a carrier. The term "carrier" as used herein refers to the means by which the pesticide is delivered to the target pest and exposed to pesticide. Carriers that may be used in accordance with the present disclosure include oils, including any type of vegetable oil, such as Canola oil, soybean oil and the like, polymers, plastics, wood, gels, colloids, sprays, drenching means, emulsifiable concentrates and so forth. The selection of the carrier and the amount of carrier used in a formulation may vary and depends on several factors including the specific pesticide use and the preferred mode of application. It is preferred however that the carrier is dry.

Other ingredients that may be used in the formulation of the final product accordance with the present disclosures include potential enzyme activators such as ascorbic acid or pH modifiers such as phosphate buffers to provide an optimum pH for the reaction when water is added to the product.

The final pesticide precursor preparation may be formulated as a spray, dust, fume or powder or in any other dry form as desired.

Use of the Pesticide Formulations

The compositions provided herein are pesticidally inactive, however they may be used to prepare a pesticidally active composition by adding water to the composition. The addition of water will result in the generation of glucosinolate breakdown products from glucosinolates and thus result in a pesticidally active product. Accordingly, the present disclosure still further provides a method for controlling pests comprising:
  (a) providing a two-part pesticide precursor system essentially free of glucosinolate breakdown products said system comprising:
    (i) a first part comprising a glucosinolate concentrate; and
    (ii) a second part comprising plant material comprising an active myrosinase complex in a concentration sufficient to release an effective amount of glucosinolate breakdown products upon the addition of water to the mixture;
  (b) mixing the first and second part of the system to obtain a mixture comprising the first and second part;
  (c) adding water to the mixture; and
  (d) applying the system to a substrate in need of pesticide treatment.

In accordance with the present disclosure, water is added to the mixture of glucosinolate concentrate and plant material comprising an active myrosinase complex after it has been prepared. In preferred embodiments the mixture is prepared in such a manner that less than 0.96 or about 0.96 myrosinase activity units per mg of glucosinolate is obtained, e.g. less than 0.50 or about 0.50 myrosinase activity units per mg of glucosinolate, or e.g. less than 0.25 units or about 0.25 myrosinase activity units per mg of glucosinolate, e.g. less than 0.20 or about 0.20 units per mg, or e.g. less than 0.15 or about 0.15 myrosinase activity units per mg of glucosinolate, or e.g. less than e.g. 0.10 units or about 0.10 myrosinase activity units per mg of glucosinolate, or e.g. less than 0.05 units or about 0.05 myrosinase activity units per mg of glucosinolate, or e.g. less than 0.01 units or about 0.01 myrosinase activity units per mg of glucosinolate, or e.g. less than 0.0075 units or about 0.0075 myrosinase activity units per mg of glucosinolate, e.g. less than 0.005 units or about 0.005 myrosinase activity units per mg of glucosinolate, or e.g. less than 0.004 units or about 0.004 myrosinase activity units per mg of glucosinolate. The hydrolysis rate achieved in the foregoing formulations preferably in excess of 12.5 µmol of glucosinolate hydrolyzed per minute, more preferably in excess of 25 or about 25 µmol glucosinolate/minute, e.g. 50 or about µmol glucosinolate/minute, 75 or about 75 µmol glucosinolate/minute, or 100 or about 100 µmol glucosinolate/minute. In preferred embodiments the glucosinolate is sinigrin. Accordingly, in preferred embodiments, the mixture is prepared in such a manner that less than 0.96 or about 0.96 myrosinase activity units per mg of sinigrin is obtained, e.g. less than 0.50 or about 0.50 myrosinase activity units per mg of sinigrin, or e.g. less than 0.25 units or about 0.25 myrosinase activity units per mg of sinigrin, e.g. less than 0.20 or about 0.20 units per mg, or e.g. less than 0.15 or about 0.15 myrosinase activity units per mg of sinigrin, or e.g. less than e.g. 0.10 units or about 0.10 myrosinase activity units per mg of sinigrin, or e.g. less than 0.05 units or about 0.05 myrosinase activity units per mg of sinigrin, or e.g. less than 0.01 units or about 0.01 myrosinase activity units per mg of sinigrin, or e.g. less than 0.0075 units or about 0.0075 myrosinase activity units per mg of sinigrin, e.g. less than 0.005 units or about 0.005 myrosinase activity units per mg of sinigrin, or e.g. less than 0.004 units or about 0.004 myrosinase activity units per mg of sinigrin. The hydrolysis rate achieved in the foregoing formulations preferably in excess of 12.5 µmol of sinigrin hydrolyzed per minute, more preferably in excess of 25 or about 25 µmol sinigrin/minute, e.g. 50 or about µmol sinigrin/minute, 75 or about 75 µmol sinigrin/minute, or 100 or about 100 µmol sinigrin/minute.

The target pest may be any pest, including any prokaryotic pest, including any prokaryotic pest belonging to the Monera kingdom, and any eukaryotic pest belonging to the Protista, fungal, plant and animal kingdoms. Accordingly the compositions of the present disclosure may be applied to any substrate requiring pesticide treatment. Pests to which the compositions of the present disclosure may be applied include any insect, arachnid or crustacean pest, including ticks, mites, weevils, ants, mosquitoes etc. Further pests to which the compositions of the present disclosure may be applied are worms and nematodes. The final applied formulation may be a spray, dust, fume, powder, liquid or any other form as desired. The delivery route to the pests may vary and may be as desired for example the pesticide product may be delivered as a fumigant, or through aquatic exposure or direct contact. Upon application of the pesticide to the pest, the incidence or severity of the pest infestation or activity will be limited or reduced at least for a limited or more prolonged period of time, and as such the novel methods and compositions disclosed herein provide a means to control pests. The pesticide may applied to any substrate in need of treatment with a pesticide. For example, the pesticide may be applied to any agricultural crop, e.g. any grain, fruit or vegetable crop at any stage of its development, or prior or to a crop growth substrate, e.g. soil, prior to crop growth and/or production or post crop production.

The pesticide application rates and regimens will vary and depend inter alia on the pest to be treated, the substrate to which the pesticide is applied, temperature and other environmental factors, and the like, however application rates and regimes can readily be determined by those of skill in the art. Where a dry pesticide formulation of the present disclosure is applied to agricultural crops, 1,000 lbs of mixed parts is typically mixed with at least 1,000 gallons of water. This amount will suffice to treat an acre of crop. By way of example, a mixture comprising 504 lbs of *Sinapis alba* meal and 504 lbs of a 24% sinigrin concentrate is preferably mixed with between 5,000 and 30,000 gallons of water and applied to an acre of crop. Where an aqueous formulation is used, kilogram quantities of both parts may be used. By way of example only, a 3.5 kg of a 24% sinigrin concentrate may be mixed with 1.3 kg of *Sinapis alba* meal (using a 0.08 myrosinase activity units/mg of sinigrin) and applied to a crop using between 5,000 and 30,000 gallons of water.

The present disclosure is further described by reference to the following examples which are illustrative only and not limiting the disclosure.

Example 1. Preparation of Inactive Pesticide Precursors Comprising Mustard Plant Material and Glucosinolate Concentrate Purified sinigrin was prepared as follows: a semi-purified concentrate of sinigrin was produced by first starting with *Brassica juncea* ground seed from which the oil had been expelled. Water was added to the ground seed at 10 parts water to 1 part plant material and the resulting slurry was agitated such that the sinigrin enters into solution in the slurry. The slurry was then processed by centrifugation using a decanter to generate a liquid phase enriched in sinigrin and extracted solids. The sinigrin concentration in the liquid phase was further increased by nanofiltration to separate sinigrin from minerals and other lower molecular weight water-soluble components (this is optional). The sinigrin concentration in the extract was further concentrated by removal of residual oil in the extract by separation on a disk-stacked centrifuge (this is optional). The liquid phase was then evaporated to further concentrate. The final semi-purified concentrate was then dried using a spray dryer to a final concentration of >30% sinigrin. The final test material containing the various concentrations of sinigrin were prepared by mixing the semi-purified sinigrin concentrate with dry plant material containing active myrosinase at ratios appropriate to achieve the target final concentration of sinigrin.

Dry mustard meal was prepared as follows: whole seed white mustard (*Sinapsis alba*) was pre-dried to <6% residual moisture followed by expelling of the seed to remove the bulk of the oil. The final meal contained less than 15% residual oil. Temperatures during pre-drying and expelling of the seed were maintained below 70° C. to prevent denaturation and thus loss of myrosinase activity.

Pesticide precursor samples were prepared comprising dry *Sinapsis alba* mustard meal and varying concentrations of dry sinigrin.

Example 2. Determining Myrosinase Activity Naturally Occurring in Mustard Seed Meal Cold pressed de-oiled mustard seed meal from several mustard species was prepared and the units of myrosinase activity per gram of cold pressed de-oiled mustard seed meal was determined. The results are set forth in Table 1.

TABLE 1

Myrosinase activity in different mustard species

| Mustard Species | Units of myrosinase activity per gram of cold pressed de-oiled mustard meal ($\mu$mol of sinigrin converted per minute) |
|---|---|
| *Brassica juncea* | 50 |
| *Brassica carinata* | 50 |
| *Sinapsis alba* | 118 |

Myrosinase activity was determined by measuring the sinigrin peak area using head space GC in samples of a mixture of seed meal (containing both myrosinase and sinigrin) and buffer over several time points and calculating the $\mu$mols of sinigrin converted per minute of incubation.

Example 3. Determining the Sinigrin Content Naturally Occurring in Mustard Seed Meal Cold pressed de-oiled mustard seed meal from several mustard species was prepared and the amount of sinigrin per gram of cold pressed de-oiled mustard seed meal was determined. The results are set forth in Table 2.

TABLE 2

Sinigrin concentrations in different mustard species

| Mustard Species | mg of sinigrin per gram of cold pressed de-oiled mustard meal |
|---|---|
| *Brassica juncea* | 52 |
| *Brassica carinata* | 58 |
| *Sinapsis alba* | 0 |

Sinigrin content of seed meal was determined using HPLC with UV detection by comparing peak area of a pure reference standard to that of seed meal extracts and test mixtures.

Example 4. Determining Myrosinase Activity as a Function of Sinigrin Naturally Occurring in Mustard Seed Meal Based on the results described in Examples 2 and 3, the myrosinase activity/mg of sinigrin was determined in various mustard seeds. The results are presented in Table 3.

TABLE 3

Myrosinase to sinigrin ratio

| Mustard species | Myrosinase activity to sinigrin (units/mg) |
|---|---|
| *Brassica juncea* | 0.96:1 |
| *Brassica carinata* | 0.86:1 |
| *Sinapsis alba* | 118:0 |

Thus in *Brassica juncea* for every mg of sinigrin present in the cold pressed de-oiled meal, there are 0.96 myrosinase activity units, and when considering *Brassica carinata*, for every mg of sinigrin present in the cold pressed de-oiled meal there are 0.86 myrosinase activity units. This data set further shows, that *Sinapsis alba* has a higher myrosinase activity than either *Brassica juncea* or *Brassica carinata*, but as noted in Table 2 above, *Sinapsis alba* does not naturally comprise sinigrin.

Example 5. Myrosinase Activity in *Brassica juncea* Mustard Meal

*Brassica juncea* meal was prepared and sinigrin hydrolysis was measured as a function of time. The results obtained are shown in Table 4.

TABLE 4

| *Brassica juncea* myrosinase activity | |
|---|---|
| *Brassica juncea* cold pressed de-oiled meal (gram) | 0.32 |
| Myrosinase (units) | 16 |
| Sinigrin (mg) | 16.6 |
| Myrosinase/Sinigrin (units/mg) | 0.96 |
| Time (minutes) | Sinigrin ($\mu$mol) |
| 0 | 340 |
| 5 | 150 |
| 10 | 160 |
| 20 | 90 |
| 30 | 0 |
| Reaction rate ($\mu$mol sinigrin/minute) | 12.5 |

The data shows that cold pressed de-oiled *Brassica juncea* meal having a myrosinase activity units per mg of sinigrin ratio of 0.96:1, displays a reaction rate 12.5 $\mu$mol and of sinigrin hydrolyzed per minute. This represents the reaction rate obtainable using mustard seed meal without the inclusion of exogenous sinigrin.

Example 6. Reaction Rates in Two Part Pesticide Precursor Systems

Various samples were prepared containing sinigrin and mustard meal and used to assay for myrosinase activity. Sinigrin and mustard meal samples were mixed and the reaction was initiated by the addition of water. Table 5 shows the compositions of the various samples as well as the myrosinase activity units in the samples. Myrosinase activity was measured as described in Example 2.

TABLE 5

Myrosinase hydrolysis rates

| Sample # | 1 | 2 | 3 | 4 | 5 | 6 | 7 |
|---|---|---|---|---|---|---|---|
| *Brassica juncea* meal (gram) | 0.32 | 0 | 0 | 0 | 0 | 0 | 0 |
| *S. alba* meal (gram) | 0 | 0.32 | 0.32 | 0.32 | 0.32 | 0.32 | 0.32 |
| Sinigrin concentrate (gram) | 0 | 0 | 0.016 | 0.032 | 0.048 | 0.064 | 0.08 |
| Myrosinase activity (μmol/sinigrin/minute) | 16 | 37.76 | 37.76 | 37.76 | 37.76 | 37.76 | 37.76 |
| Sinigrin in formulation (mg) | 16.64 | 0 | 16 | 32 | 48 | 64 | 80 |
| Myrosinase/Sinigrin (units/mg) | 0.96:1 | N.A. | 2.36:1 | 1.18:1 | 0.79:1 | 0.59:1 | 0.47:1 |

| Time (minutes) | μmol Sinigrin in Solution | | | | | | |
|---|---|---|---|---|---|---|---|
| 0 | 340 | 0 | 370 | 640 | 1130 | 2190 | 4620 |
| 5 | 150 | 0 | 260 | 530 | 830 | 1860 | 3160 |
| 10 | 160 | 0 | 90 | 300 | 670 | 1800 | 2750 |
| 20 | 90 | 0 | 0 | 0 | 270 | 880 | 1950 |
| 30 | 0 | 0 | 0 | 0 | 60 | 310 | 1170 |
| 45 | 0 | 0 | 0 | 0 | 0 | 0 | 260 |
| 60 | 0 | 0 | 0 | 0 | 0 | 0 | 0 |
| 75 | 0 | 0 | 0 | 0 | 0 | 0 | 0 |
| 90 | 0 | 0 | 0 | 0 | 0 | 0 | 0 |
| Myrosinase activity (μmol sinigrin/minute) | 12.5 | N.A. | 28 | 34 | 35.6 | 62.7 | 96.9 |

Naturally occurring hydrolysis rates in mustard plant material are 12.5 μmol sinigrin per minute (see: sample #1). At a decreasing myrosinase activity unit/mg of sinigrin ratio, the sinigrin hydrolysis rate increases from 28 μmol sinigrin per minute at a myrosinase activity unit/mg of sinigrin ratio of 2.36:1 (see: sample #3) to 96.9 μmol sinigrin per minute at a myrosinase activity unit/mg of sinigrin ratio of 0.47:1 (see: sample #7). Thus, surprisingly, a much smaller amount of myrosinase activity units/mg of sinigrin is required to achieve a higher rate of hydrolysis than the amount that is naturally present in seed meal. Under the conditions selected for the assays, the hydrolysis reaction rate can be increased from 12.5 μmol of sinigrin per minute to 96.8 μmol of sinigrin per minute. This increase in reaction rate represents an 87% increase in the reaction rate, when compared to the hydrolysis rate occurring when mustard plant material (cold pressed de-oiled *Brassica juncea* meal) is used. At the same time, it is possible to reduce the availability of myrosinase activity units by almost 50% per gram of final formulation, dropping the myrosinase activity per mg of sinigrin from 0.96 in *Brassica juncea* meal to 0.47 in sample #7.

Example 7. Allyl Isothiocyanate Production in a Two-Part *Brassica carinata* Pesticide Precursor System Production

*Brassica carinata* meal and sinigrin samples were prepared and mixed and the hydrolysis reaction was initiated by the addition of water. Following 10 minutes of incubation gas chromatography was used to identify an AITC peak. The results are shown in Table 6.

TABLE 6 allyl isothiocyanate production in *Brassica carinata*

| *Brassica carinata* | Meal/ Product (mg/gram) | Myrosinase (Units) | Sinigrin (mg) | Myrosinase/ Singrin | AITC Peak |
|---|---|---|---|---|---|
| Meal | 1000 | 50 | 58 | 0.86 | 68 |
| Meal + 50 mg sinigrin | 950 | 47.5 | 67.1 | 0.71 | 307 |

TABLE 6-continued allyl isothiocyanate production in *Brassica carinata*

| *Brassica carinata* | Meal/ Product (mg/gram) | Myrosinase (Units) | Sinigrin (mg) | Myrosinase/ Singrin | AITC Peak |
|---|---|---|---|---|---|
| Meal + 105 mg sinigrin | 895 | 44.8 | 76.9 | 0.58 | 299 |

It can be seen from the results shown in Table 6 that by decreasing the ratio of myrosinase activity units per mg of sinigrin from 0.86 to 0.7 the AITC peak increases from a peak area of 68 to 307. Additionally, this peak can still be maintained by reducing the myrosinase activity units per mg of sinigrin to 0.58. This data compliments the data in Example 5 outlining the increased hydrolysis rate of μmol of sinigrin per minute, as allyl isothiocyanate is a degradation product formed upon the hydrolysis of sinigrin catalyzed by myrosinase. AITC production was determined using Headspace GC by sampling the headspace above seed meal extracts and test mixtures and measuring the peak area of the AITC peak compared to that of a pure reference standard.

Example 8. Allyl Isothiocyanate Production in a Two-Part Part *Sinapsis alba* Pesticide Precursor System Production

*Sinapsis alba* meal and sinigrin samples were prepared and mixed and the hydrolysis reaction was initiated by the addition of water. Following 10 minutes of incubation gas chromatography was used identify an AITC peak. The results are shown in Table 7.

TABLE 7 allyl isothiocyanate production in *Sinapsis alba*

| *Sinapsis alba* | Meal/ Product (mg/gram) | Myrosinase (Units) | Sinigrin (mg) | Myrosinase/ Singrin | AITC Peak |
|---|---|---|---|---|---|
| Meal | 1000 | 118 | 0 | n/a | n/a |
| Meal + 50 mg sinigrin | 950 | 112.1 | 12 | 9.34:1 | 227 |

TABLE 7-continued allyl isothiocyanate production in *Sinapsis alba*

| Sinapsis alba | Meal/Product (mg/gram) | Myrosinase (Units) | Sinigrin (mg) | Myrosinase/Singrin | AITC Peak |
|---|---|---|---|---|---|
| Meal + 75 mg | 925 | 109.2 | 18 | 6.06:1 | 373 |
| Meal + 105 mg sinigrin | 105 | 105.6 | 25 | 4.22:1 | 448 |

It can be seen from the results shown in Table 7 that by decreasing the activity of myrosinase activity units per mg of sinigrin from 9.34 to 4.22 the AITC peak increases from a peak area of 227 to 448. This represents an increase in AITC production within 10 minutes of approximately 50% even with a reduced myrosinase content in the final formulation of roughly 55%. This data compliments the data in Example 5 outlining the increased hydrolysis rate of μmol of sinigrin per minute, as allyl isothiocyanate is a degradation product formed upon the hydrolysis of sinigrin catalyzed by myrosinase.

AITC production was determined using Headspace GC by sampling the headspace above seed meal extracts and test mixtures and measuring the peak area of the AITC peak compared to that of a pure reference standard.

Figure 1:
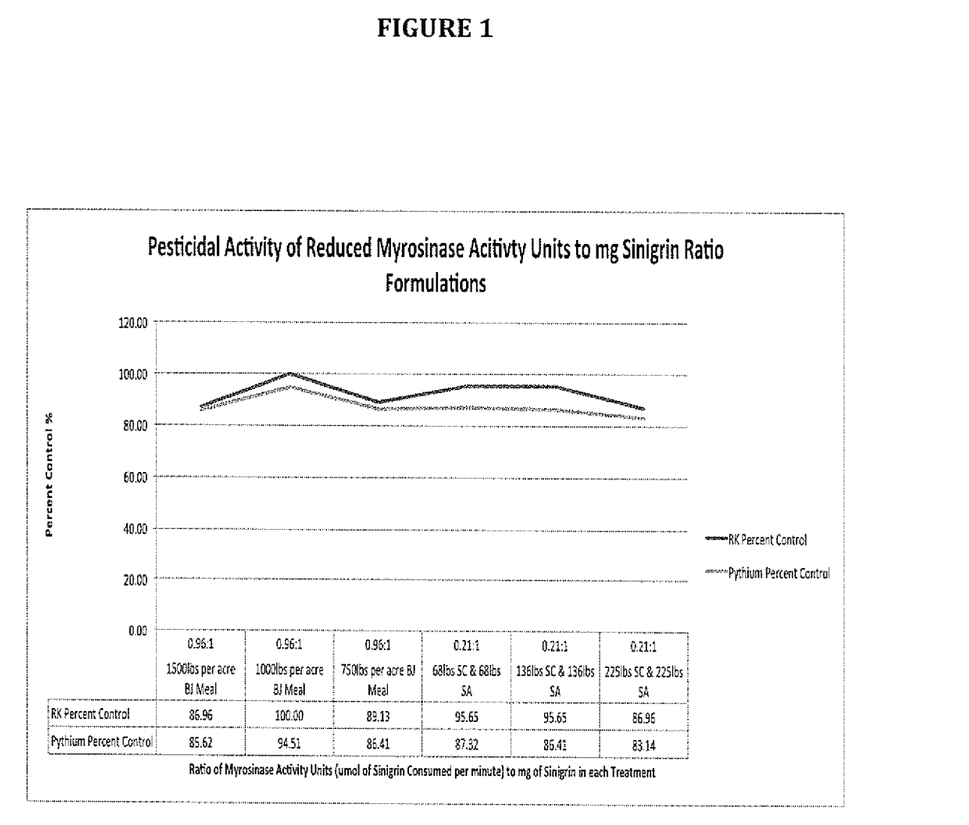
FIG. 1 depicts a graph showing nematicidal and fungicidal control using a two-part pesticide precursor system prepared in accordance with the present disclosure.

Example 9. Nematocidal and Fungicidal Activity of Two-Part Pesticide Precursor System A *Brassica juncea* meal extract was prepared to treat root knot on tomato plants. The meal extract was applied to a tomato crop upon mixing the extract with water using different application rates (1,500 lbs/acre; 1,000 lbs/acre and 750 lbs/acre), maintaining a ratio of myrosinase activity units per mg of sinigrin concentration of 0.96. The specifications are further shown in Table 8. As shown in Table 8 and FIG. 1, at the different application rates, root knot control was obtained varying from 87%-100%. A two part set of pesticide precursor preparation was prepared using *Sinapsis alba* meal as the first part, and the source of myrosinase, and a 24% sinigrin extract as the second part. Each of the parts was mixed with water, and then the two parts were ad-mixed and different quantities were applied to a tomato crop to control a root knot infection. The ratio of myrosinase activity units per mg sinigrin of the mixture for each quantity applied was 0.21. Table 8 and FIG. 1 show that at a myrosinase activity units per mg of sinigrin that is 4.57 times lower (0.21) than the activity naturally present in meal (0.96), the same pesticide activity may be obtained. The same formulations were also used to control the fungus *Pythium* on tomato plants. As can be seen in FIG. 1 using the *Brassica juncea* formulation having a myrosinase activity unit per mg of sinigrin of 0.96, a level of pest control between 86% and 95% can be obtained (using the different specified application rates). Again, using the two-part formulation having a myrosinase activity unit per mg of sinigrin of 0.21, similar levels of control may be achieved, varying between 83% and 87%, despite the much lower amounts of myrosinase present in these formulations.

TABLE 8

Root knot control using a two-part system

| | Myrosinase Activity (Units) | Sinigrin (mg) | Myrosinase/Sinigrin (Units/mg) | RK Count | % RK Control |
|---|---|---|---|---|---|
| 1 gram BJ Meal | 50 | 52 | 0.96 | N.A. | N.A. |
| 1500 lbs BJ Meal | 33,975,000 | 35,334,000 | 0.96 | 1.5 | 86.96 |
| 1000 lbs BJ Meal | 22,650,000 | 23,556,000 | 0.96 | 0 | 100 |
| 750 lbs BJ Meal | 16,987,000 | 17,667,000 | 0.96 | 1.25 | 89.13 |
| Sinigrin (lbs) (24% concentrate) *S. alba* | | | | | |
| 68  68 | 1,540,200 | 7,392,960 | 0.21 | 0.5 | 95.65 |
| 136  136 | 3,080,400 | 14,785,920 | 0.21 | 0.5 | 95.65 |
| 225  225 | 5,096,250 | 24,462,000 | 0.21 | 1.5 | 86.96 |
| Control | | | | 11.5 | 0 |

Figure 2:
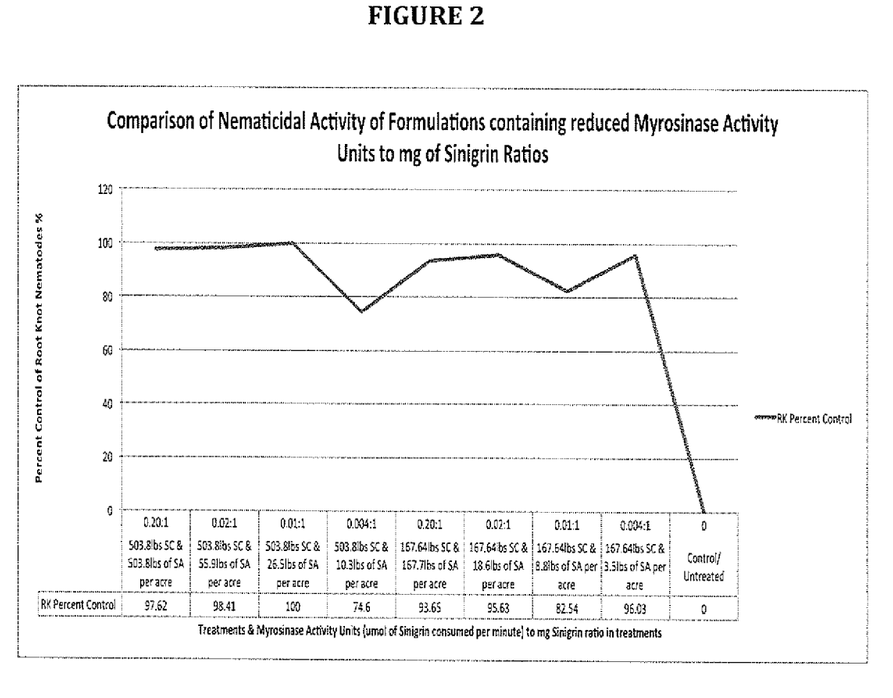
FIG. 2 depicts a graph showing nematicidal control using formulations comprising various concentrations of myrosinase.

In a further experiment, the myrosinase activity unit per mg of sinigrin of a two part *Sinapsis alba* formulation was reduced further from 0.21 to 0.004 myrosinase activity units per mg of sinigrin, by reducing the relative amount of *Sinapsis alba* meal in the formulation, and each of the formulations were applied at two different application rates to a tomato crop to control of root knot nematodes. Table 9 and FIG. 2 show the specifications and results. The 50-fold reduction in myrosinase activity units per mg of sinigrin resulted in similar levels of pest control. In this experiment, the myrosinase activity units/mg of sinigrin relative to the naturally present myrosinase activity units/mg of sinigrin (0.96) was reduced 240-fold. This Example thus further demonstrates that unexpectedly low levels of myrosinase may be included in the two-part precursor system to obtain an efficacious product.

TABLE 9

Root knot control using different myrosinase activity/sinigrin concentrations

| Application | Myrosinase activity/sinigrin (units/mg) | RK Control (%) |
|---|---|---|
| 503.8 lbs SC & 503.8 lbs SA per acre | 0.2 | 97.62 |
| 503.8 lbs SC & 55.9 lbs SA per acre | 0.02 | 98.41 |
| 503.8 lbs SC & 26.5 SA lbs per acre | 0.01 | 100 |
| 503.8 lbs SC & 10.3 SA lbs per acre | 0.004 | 74.6 |
| 167.64 lbs SC & 167.7 lbs SA per acre | 0.2 | 93.65 |
| 167.64 lbs SC & 18.6 lbs SA per acre | 0.02 | 95.63 |
| 167.64 lbs SC & 8.8 lbs SA per acre | 0.01 | 82.54 |
| 167.64 lbs SC & 3.5 SA per acre | 0.004 | 96.03 |
| Untreated Control | 0 | 0 |

The invention claimed is:

1. A two-part fungicide precursor system comprising
(a) a first contained part comprising a sinigrin-containing glucosinolate concentrate obtained from a *Brassica* plant material comprising less than 0.5% of glucosinolate breakdown products, and
(b) a second separately contained part comprising a *Sinapis alba* plant material comprising an active myrosinase complex in a concentration sufficient to release an effective amount of allyl isothiocyanate upon mixing of the first and second part in the presence of water, and
wherein the amount of sinigrin in the first part, the amount and activity of the myrosinase complex in the second part, and the relative amounts of the first and second parts are such that, upon mixing of the two parts in the presence of water, a fungicide formulation is obtained in which the myrosinase activity is less than 0.5 of myrosinase enzyme activity units/mg of sinigrin naturally present in *Brassica* plant material, and more than 12.5 µmol of sinigrin is hydrolyzed per minute per unit of active myrosinase complex.

2. The two-part fungicide precursor system according to claim 1 wherein upon mixing of the two parts a formulation is obtained in which the myrosinase activity is less than 0.10 myrosinase enzyme activity units/mg of sinigrin, and more than 12.5 µmol of sinigrin is hydrolyzed per minute per unit of active myrosinase complex.

3. A two-part fungicide precursor system according to claim 1, wherein the first part is a dry sinigrin containing glucosinolate concentrate and the second part is a dry *Sinapis alba* plant material.

4. The two-part fungicide precursor system according to claim 3 wherein the dry *Sinapis alba* plant material is a *Sinapis alba* seed meal.

5. A two-part fungicide precursor system according to claim 1, wherein the first part is a sinigrin-containing dry glucosinolate concentrate and the second part is a dry *Sinapis alba* plant material, wherein the relative humidity of each of the sinigrin-containing glucosinolate concentrate and the dry *Sinapis alba* plant material is about 15% or less.

6. The two-part fungicide precursor system according to claim 1, wherein at least one of the two parts is prepared in liquid form and the two parts are separate until application to a substrate in need of treatment by the fungicide formulation.

7. A two-part fungicide precursor system according to claim 1, wherein the myrosinase activity is less than 0.47 myrosinase enzyme activity units/mg of sinigrin.

8. A method of preparing a two-part fungicide precursor system comprising preparing
(a) a first contained part comprising a sinigrin-containing glucosinolate concentrate obtained from a *Brassica* plant material comprising less than 0.5% of glucosinolate breakdown products, and
(b) a second separately contained part comprising a *Sinapis alba* plant material comprising an active myrosinase complex in a concentration sufficient to release an effective amount of allyl isothiocyanate upon mixing of the first and second component in the presence of water,
wherein the amount of sinigrin in the first part, the amount and activity of the myrosinase complex in the second part, and the relative amounts of the first and second parts are such that, upon mixing of the two parts in the presence of water, a fungicide formulation is obtained in which the myrosinase activity is less than 0.5 myrosinase enzyme activity units/mg of sinigrin naturally present in *Brassica* plant material, and more than 12.5 µmol of sinigrin is hydrolyzed per minute per unit of active myrosinase complex.

9. The method according to claim 8 wherein the *Sinapis alba* plant material comprising an active myrosinase complex is a *Sinapis alba* seed meal.

10. The method according to claim 8 wherein the first part is a dry sinigrin-containing glucosinolate and the second part is a dry *Sinapis alba* plant material.

11. The method according to claim 8 wherein the first part is a dry sinigrin-containing glucosinolate and the second part is a dry *Sinapis alba* plant material and wherein the relative humidity of each of the dry sinigrin-containing glucosinolate concentrate and the *Sinapis alba* plant material comprising an active myrosinase complex is less than about 15%.

12. A method of preparing a two-part fungicide precursor system according to claim 8, wherein the myrosinase activity is less than 0.47 myrosinase enzyme activity units/mg of sinigrin.

13. A method for controlling fungal pests comprising:
(a) providing a two-part fungicide precursor system, said system comprising:
    (i) a first contained part comprising an aqueous sinigrin-containing glucosinolate concentrate obtained from a *Brassica* plant material less than 0.5% of glucosinolate breakdown products comprising in excess of 10% (v/v) water; and (ii) a second separately contained part comprising a *Sinapis alba* plant material comprising an active myrosinase complex in a concentration sufficient to release an effective amount of allyl isothiocyanate upon the addition of water to the mixture;
(b) mixing the first part and second part of the system to obtain a mixture wherein the amount of sinigrin in the first part, the amount and activity of the myrosinase complex in the second part, and the relative amounts of the first and second parts are such that, upon mixing of the two parts, a mixture is obtained in which the myrosinase activity is less than one half of the myrosinase activity per unit mass of sinigrin naturally present in the *Brassica* plant material;
(c) adding water to the mixture to obtain a fungicide formulation; and
(d) applying the fungicide formulation to a substrate in need of fungicide treatment, wherein upon mixing of the two parts in step (c) the fungicide formulation is obtained wherein the myrosinase activity is less than 0.5 myrosinase enzyme activity units/mg of sinigrin naturally present in the *Brassica* plant material, and wherein more than 12.5 µmol of sinigrin is hydrolyzed per minute per unit of active myrosinase complex.

14. A method for controlling fungal pests according to claim 13, wherein upon adding water in step (c) the myrosinase activity is less than 0.1 myrosinase enzyme activity units/mg of sinigrin, and wherein more than 12.5 µmol of sinigrin is hydrolyzed per minute per unit of active myrosinase complex.

15. A method for controlling fungal pests according to claim 13, wherein the myrosinase activity is less than 0.47 myrosinase enzyme activity units/mg of sinigrin.

* * * * *